(12) United States Patent
Imaoka et al.

(10) Patent No.: US 11,746,263 B2
(45) Date of Patent: *Sep. 5, 2023

(54) AQUEOUS EMULSION AND ADHESIVE USING SAME

(71) Applicant: KURARAY CO., LTD., Kurashiki (JP)

(72) Inventors: Yoriko Imaoka, Kurashiki (JP); Tatsuya Tanida, Frankfurt am Main (DE)

(73) Assignee: KURARAY CO., LTD., Kurashiki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/625,202

(22) PCT Filed: Jul. 6, 2020

(86) PCT No.: PCT/JP2020/026332
§ 371 (c)(1),
(2) Date: Jan. 6, 2022

(87) PCT Pub. No.: WO2021/006233
PCT Pub. Date: Jan. 14, 2021

(65) Prior Publication Data
US 2022/0259468 A1    Aug. 18, 2022

(30) Foreign Application Priority Data
Jul. 8, 2019    (JP) .................................. 2019-127054

(51) Int. Cl.
| C09J 4/06 | (2006.01) |
| C09J 131/04 | (2006.01) |
| C09J 11/08 | (2006.01) |

(52) U.S. Cl.
CPC ............... C09J 131/04 (2013.01); C09J 4/06 (2013.01); C09J 11/08 (2013.01)

(58) Field of Classification Search
CPC .. C09J 131/04; C09J 4/06; C09J 11/08; C08F 2/30; C08F 8/12; C08F 218/08; C09D 131/04
USPC ...................................................... 524/501
See application file for complete search history.

(56) References Cited

U.S. PATENT DOCUMENTS

| 2009/0118416 A1* | 5/2009 | Nakamae ................. C09D 7/65 524/503 |
| 2020/0392364 A1 | 12/2020 | Morikawa et al. |
| 2021/0108111 A1* | 4/2021 | Tanida .................... C08L 29/04 |
| 2021/0292502 A1 | 9/2021 | Fukuhara et al. |
| 2022/0259467 A1* | 8/2022 | Taoka ................... C09J 129/04 |

FOREIGN PATENT DOCUMENTS

| EP | 3 783 039 A1 | 2/2021 |
| JP | H08-81666 A | 3/1996 |
| JP | 10-121017 A | 5/1998 |
| JP | 11-106727 A | 4/1999 |
| JP | 2000-109630 A | 4/2000 |
| JP | 2001-123138 A | 5/2001 |
| WO | WO 2018/117246 A1 | 6/2018 |
| WO | WO 2019/117118 A1 | 6/2019 |
| WO | WO 2019/203216 A1 | 10/2019 |
| WO | WO 2020/017527 A1 | 1/2020 |

OTHER PUBLICATIONS

International Search Report dated Oct. 6, 2020 in PCT/JP2020/026332 filed on Jul. 6, 2020, (citing references AQ-AV therein, 3 pages).
Extended European Search Report dated Jun. 27, 2023, in European Patent Application No. 20837240.9 (6 pages).

* cited by examiner

*Primary Examiner* — Hannah J Pak
(74) *Attorney, Agent, or Firm* — Oblon, McClelland, Maier & Neustadt, L.L.P.

(57) ABSTRACT

An aqueous emulsion may include: an ethylene-vinyl alcohol copolymer (A) as a dispersant; and a polymer (B) containing an unsaturated ethylenic monomer unit as a dispersoid, wherein the ethylene-vinyl alcohol copolymer (A) has a content of ethylene units of 1 mol % or more and less than 20 mol % and a block character of the ethylene units from 0.90 to 0.99. The aqueous emulsion may contain the ethylene-vinyl alcohol copolymer (A), as a dispersant, having a specific structure and is thus excellent in storage stability at low temperatures and water-resistant adhesiveness.

12 Claims, 2 Drawing Sheets

21

22

23

24

AQUEOUS EMULSION AND ADHESIVE USING SAME

CROSS-REFERENCE TO RELATED APPLICATIONS

The present application is the national stage of international application PCT/JP2020/026332, filed on Jul. 6, 2020, and claims the benefit of the filing date of Japanese Appl. No. 2019-127054, filed on Jul. 8, 2019.

TECHNICAL FIELD

The present invention relates to an aqueous emulsion having excellent stability at low temperatures and high water-resistant adhesiveness and to an adhesive containing the aqueous emulsion.

BACKGROUND ART

Polyvinyl alcohols (hereinafter, may be abbreviated as "PVAs") are known as water-soluble synthetic polymers and widely used as, in addition to materials for fiber and films, paper treatment agents, fiber treatment agents, binders for inorganic materials, adhesives, stabilizers for emulsion polymerization and suspension polymerization, and the like. In particular, PVAs are known as protective colloids for emulsion polymerization of vinyl ester monomers represented by vinyl acetate, and aqueous vinyl ester polymer-based emulsions obtained by emulsion polymerization using such a PVA as a stabilizer are widely used in the fields of woodworking glue, paint bases, coating agents, various binders for impregnated paper, nonwoven fabric products, and the like, admixtures, construction joints, paper treatment agents, fiber treatment agents, and the like.

However, such an aqueous emulsion obtained by emulsion polymerization using a PVA as a stabilizer is known to have low water resistance. Water resistance is sometimes expected particularly for adhesive use among the uses described above. In such a case, widely used techniques include using a PVA exhibiting high water resistance after forming a coating as a protective colloid, copolymerizing a small amount of crosslinking monomer with vinyl ester monomers, and the like.

Patent Document 1 proposes an emulsion obtained by copolymerizing vinyl acetate monomers and N-methylolacrylamide using a PVA as a protective colloid to achieve high water resistance due to the crosslinking reaction of the N-methylolacrylamide monomer units. This method, however, has an environmental problem of producing formaldehyde, which is one the agents causing sick house syndrome.

In addition, to improve specific aspects of PVA performance, various modified PVAs are developed and Patent Document 2, for example, proposes an aqueous emulsion of a PVA containing α-olefin units with a carbon number of 4 or less at a specific ratio as a dispersant and a (co)polymer using one or more monomers selected from unsaturated ethylenic monomers as a dispersoid. Patent Document 2 describes that the aqueous emulsion exhibits high water resistance compared with conventional PVAs. Moreover, Patent Document 3 proposes a method of emulsion (co) polymerizing vinyl acetate or vinyl acetate with (meth) acrylic ester using an ethylene-vinyl alcohol copolymer as a protective colloid. However, such an aqueous emulsion has insufficient storage stability at low temperatures and sometimes also has poor applicability to adherends.

PRIOR ART DOCUMENTS

Patent Documents

Patent Document 1: JP 10-121017 A
Patent Document 2: JP 11-106727 A
Patent Document 3: JP 2001-123138 A

SUMMARY OF THE INVENTION

Problems to be Solved by the Invention

The present invention has been made based on the situations as described above and it is an object thereof to provide an aqueous emulsion excellent in storage stability at low temperatures and water-resistant adhesiveness.

Means for Solving the Problems

As a result of intensive studies, the present inventors have found that a specific aqueous emulsion is capable of solving the above problems and have come to complete the present invention.

That is, the present invention relates to the following.

[1] An aqueous emulsion comprising: an ethylene-vinyl alcohol copolymer (A) as a dispersant; and a polymer (B) containing an unsaturated ethylenic monomer unit as a dispersoid, wherein
the ethylene-vinyl alcohol copolymer (A) has a content of ethylene units of 1 mol % or more and less than 20 mol % and a block character of the ethylene units from 0.90 to 0.99.
[2] The aqueous emulsion according to [1] above, wherein the ethylene-vinyl alcohol copolymer (A) has a viscosity-average degree of polymerization from 200 to 5000 and a degree of saponification from 80 to 99.7 mol %.
[3] The aqueous emulsion according to [1] or [2] above, further comprising from 0.000001 to 0.01 parts by mass of a compound with a molecular weight of 1000 or less having a conjugated double bond based on 100 parts by mass of the ethylene-vinyl alcohol copolymer (A).
[4] The aqueous emulsion according to any one of [1] through [3] above, wherein the polymer (B) contains 70 mass % or more of monomer units derived from at least one selected from the group consisting of a vinyl ester monomer, a (meth)acrylic ester monomer, a styrene monomer, and a diene monomer based on the total monomer units.
[5] The aqueous emulsion according to any one of [1] through [4] above, wherein a mass ratio (A)/(B) of the ethylene-vinyl alcohol copolymer (A) to the polymer (B) is from 2/98 to 40/60.
[6] The aqueous emulsion according to any one of [1] through [5] above, further comprising from 0.0001 to 1 part by mass of an aliphatic alcohol (C) based on 100 parts by mass of the ethylene-vinyl alcohol copolymer (A).
[7] An adhesive comprising the aqueous emulsion according to any one of [1] through [6] above.
[8] A method of producing the aqueous emulsion according to any one of [1] through [6] above, comprising emulsion polymerizing the unsaturated ethylenic monomer in the presence of the dispersant containing the ethylene-vinyl alcohol copolymer (A).

Effects of the Invention

The aqueous emulsion of the present invention contains the ethylene-vinyl alcohol copolymer (A) having a specific structure as a dispersant and is thus excellent in storage stability at low temperatures and water-resistant adhesiveness. In addition, the aqueous emulsion further contains the aliphatic alcohol (C) to improve applicability to adherends without impairing the physical properties. Accordingly, such an aqueous emulsion is preferably used for various adhesives, paints, fiber treatment agents, paper treatment agents, binders for inorganic materials, cement admixtures, mortar primers, and the like.

MODES FOR CARRYING OUT THE INVENTION

Ethylene-Vinyl Alcohol Copolymer (A)

Figure 1:
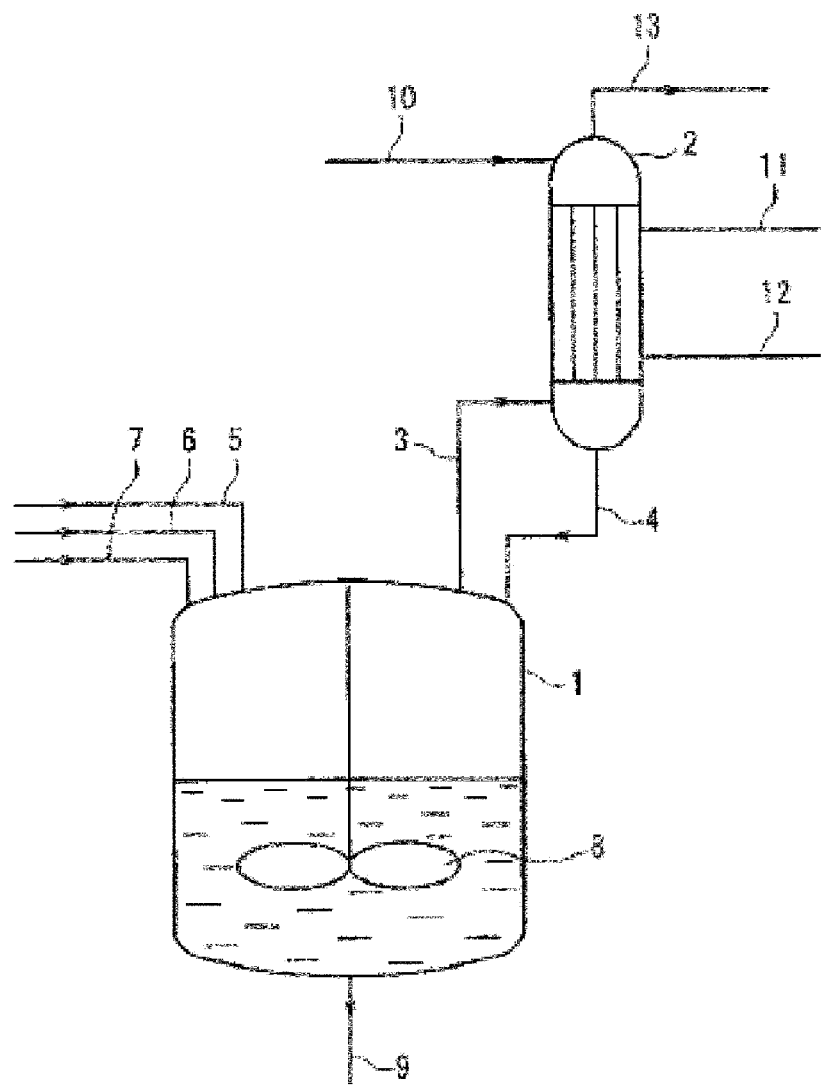
FIG. 1 is a schematic view of a polymerization apparatus used in Examples.

An aqueous emulsion of the present invention contains an ethylene-vinyl alcohol copolymer (A) characterized in having a content of ethylene units of 1 mol % or more and less than 20 mol % and a block character of the ethylene units from 0.90 to 0.99. These points are described below.

Block Character of Ethylene Units

A major characteristic of the ethylene-vinyl alcohol copolymer (A) is that the block character of the ethylene units is from 0.90 to 0.99. The block character of 0.90 or more improves storage stability at low temperatures and water-resistant adhesiveness of the resulting aqueous emulsion. The block character is preferably 0.93 or more and more preferably 0.95 or more. Meanwhile, the block character is 0.99 or less. The block character of 0.99 or less improves water-resistant adhesiveness of the resulting aqueous emulsion.

It should be noted that the block character is a numerical value that indicates the distribution of the ethylene units and vinyl alcohol units formed by saponification of vinyl ester units and takes values between 0 and 2. The value "0" indicates that the ethylene units or the vinyl alcohol units are distributed fully blockwise. With an increase in the value, both units are distributed more alternately. The value "1" indicates that the ethylene units and the vinyl alcohol units are completely randomly present. The value "2" indicates that the ethylene units and the vinyl alcohol units are completely alternately present. The block character is determined by $^{13}$C-NMR as follows. First, an ethylene-vinyl alcohol copolymer is saponified to a degree of saponification of 99.9 mol % or more, followed by thorough washing with methanol and drying at 90° C. under reduced pressure for 2 days. The completely saponified ethylene-vinyl alcohol copolymer thus obtained is dissolved in DMSO-ds and then the sample thus obtained is subjected to measurement using a 500 MHz $^{13}$C-NMR spectrometer (JEOL GX-500) at 80° C. Using a molar fraction of vinyl alcohol-ethylene two-unit chains (AE), a molar fraction of the vinyl alcohol units (A), and a molar fraction of the ethylene units (E) assigned and calculated from the obtained spectrum as described in T. Moritani and H. Iwasaki, 11, 1251-1259, Macromolecules (1978), a block character (η) of the ethylene units is determined according to the following equation:

$$\eta = (AE)/\{2 \times (A) \times (E)\}$$

The ethylene-vinyl alcohol copolymer (A) having the block character of the ethylene units defined above can be produced by a special method comprising a polymerization step and a saponification step described later. This production method is described later in detail. The present inventors have found that an aqueous emulsion excellent in storage stability at low temperatures and water-resistant adhesiveness is obtained using the ethylene-vinyl alcohol copolymer (A), as a dispersant, with the block character of the ethylene units satisfying the range described above. The ethylene-vinyl alcohol copolymer (A) will be further detailed below.

Vinyl Ester

The ethylene-vinyl alcohol copolymer (A) of the present invention is produced by copolymerizing ethylene and a vinyl ester to give an ethylene-vinyl ester copolymer and then saponifying the ethylene-vinyl ester copolymer. Examples of the vinyl ester to be used include vinyl formate, vinyl acetate, vinyl propionate, vinyl valerate, vinyl caprate, vinyl laurate, vinyl stearate, vinyl benzoate, vinyl pivalate, and vinyl versatate, particularly preferably vinyl acetate.

Ethylene Unit Content

The ethylene-vinyl alcohol copolymer (A) of the present invention has a content of the ethylene units of 1 mol % or more and less than 20 mol %. If the ethylene unit content is less than 1 mol %, the resulting aqueous emulsion exhibits insufficient water-resistant adhesiveness. The ethylene unit content is preferably 1.5 mol % or more and more preferably 2 mol % or more. If the ethylene unit content is 20 mol % or more, the ethylene-vinyl alcohol copolymer is insoluble in water and preparation of an emulsion becomes difficult. The ethylene unit content is preferably 15 mol % or less, more preferably 10 mol % or less, and even more preferably 8.5 mol % or less.

The ethylene unit content is determined, for example, from $^1$H-NMR of a precursor of an ethylene-vinyl alcohol copolymer or an ethylene-vinyl ester copolymer as a re-acetylated product by the following method. A sample of the ethylene-vinyl ester copolymer is purified by reprecipitation three or more times using a mixed solution of n-hexane and acetone and then dried at 80° C. under reduced pressure for 3 days to prepare an ethylene-vinyl ester copolymer for analysis. The ethylene-vinyl ester copolymer thus obtained is dissolved in DMSO-d$_6$, followed by $^1$H-NMR (500 MHz) analysis at 80° C. The ethylene unit content can be calculated using peaks derived from the main-chain methine of the vinyl ester (4.7 to 5.2 ppm) and peaks derived from the main-chain methylene of ethylene and the vinyl ester (0.8 to 1.6 ppm).

Degree of Saponification

The ethylene-vinyl alcohol copolymer (A) of the present invention preferably has a degree of saponification of 80 mol % or more, more preferably 82 mol % or more, and even more preferably 85 mol % or more. Meanwhile, the degree of saponification is preferably 99.7 mol % or less, more preferably 99 mol % or less, and even more preferably 98.5 mol % or less. When the degree of saponification is the lower limit or more, transparency of an aqueous solution of the ethylene-vinyl alcohol copolymer (A) and water-resistant adhesiveness of the resulting aqueous emulsion are further improved. Meanwhile, when the degree of saponification is the upper limit or less, stable production of the ethylene-vinyl alcohol copolymer (A) is facilitated and polymerization stability is also improved because aggregates are less likely to be produced during preparation of the aqueous emulsion. The degree of saponification of the ethylene-vinyl alcohol copolymer (A) can be determined in accordance with JIS K6726 (1994).

Viscosity-Average Degree of Polymerization

The ethylene-vinyl alcohol copolymer (A) of the present invention preferably has a viscosity-average degree of polymerization of 200 or more, more preferably 250 or more, even more preferably 300 or more, and particularly preferably 400 or more. Meanwhile, the viscosity-average degree of polymerization is preferably 5000 or less, more preferably 4500 or less, even more preferably 4000 or less, and particularly preferably 3500 or less. When the viscosity-average degree of polymerization is the lower limit or more, the resulting aqueous emulsion has excellent film formability and thus tends to have excellent water-resistant adhesiveness. Meanwhile, when the viscosity-average degree of polymerization is the upper limit or less, the aqueous ethylene-vinyl alcohol copolymer (A) solution is less likely to increase the viscosity and to be difficult to be handled. The viscosity-average degree of polymerization is referred to as P and can be determined in accordance with JIS K6726 (1994). That is, the ethylene-vinyl alcohol copolymer (A) of the present invention is re-saponified to a degree of saponification of 99.5 mol % or more and purified, and then P can be calculated by the following equation using limiting viscosity [η] (L/g) determined in water at 30° C.

$$P=([\eta] \times 10000/8.29)^{(1/0.62)}$$

Other Monomer Units

The ethylene-vinyl alcohol copolymer (A) of the present invention may contain monomer units other than the vinyl alcohol units, the ethylene units, and the vinyl ester units as long as the effects of the present invention are not impaired. Examples of such other monomer units include units derived from: α-olefins, such as propylene, n-butene, and isobutylene; acrylic acid and salts thereof; acrylic esters; methacrylic acid and salts thereof; methacrylic esters; acrylamides; acrylamide derivatives, such as N-methylacrylamide, N-ethylacrylamide, N,N-dimethylacrylamide, diacetone acrylamide, acrylamide propanesulfonic acid and salts thereof, acrylamide propyldimethylamine and salts thereof and quaternary salts thereof, and N-methylolacrylamide and derivatives thereof; methacrylamides; methacrylamide derivatives, such as N-methylmethacrylamide, N-ethylmethacrylamide, methacrylamide propanesulfonic acid and salts thereof, methacrylamide propyldimethylamine and salts thereof and quaternary salts thereof, N-methylolmethacrylamide and derivatives thereof; vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles, such as acrylonitrile and methacrylonitrile; vinyl halides, such as vinyl chloride and vinyl fluoride; vinylidene halides, such as vinylidene chloride and vinylidene fluoride; allyl compounds, such as allyl acetate and allyl chloride; unsaturated dicarboxylic acids, such as maleic acid, itaconic acid, and fumaric acid, and salts thereof and esters thereof; vinylsilyl compounds, such as vinyltrimethoxysilane; isopropenyl acetate; and the like. A content of these other monomer units is, depending on the intended objective, use, and the like, preferably 10 mol % or less, more preferably less than 5 mol %, even more preferably less than 1 mol %, and particularly preferably less than 0.5 mol %.

Method of Producing Ethylene-Vinyl Alcohol Copolymer (A)

A preferred method of producing the ethylene-vinyl alcohol copolymer (A) of the present invention is a method of producing the ethylene-vinyl alcohol copolymer (A) by reacting ethylene with the vinyl ester to give an ethylene-vinyl ester copolymer and then saponifying the ethylene-vinyl ester copolymer, comprising, in production of the ethylene-vinyl ester copolymer, (a) the step of contacting a solution containing the vinyl ester with an ethylene-containing gas while stirring the solution with a wide paddle blade in a polymerization vessel to obtain a stirring power Pv per unit volume from 0.5 to 10 kW/m$^3$ and a Froude number Fr from 0.05 to 0.2. By contacting the solution containing the vinyl ester with the ethylene-containing gas in such a manner, the block character of the ethylene units of the ethylene-vinyl alcohol copolymer (A) can be within the above range. The production method will be detailed below.

Polymerization Step

In the polymerization step, ethylene is reacted (copolymerized) with the vinyl ester to give an ethylene-vinyl ester copolymer. The copolymerization of ethylene and the vinyl ester is preferably conducted by solution polymerization where ethylene and the vinyl ester are copolymerized in an organic solvent, such as an alcohol. Examples of the alcohol include lower alcohols, such as methanol and ethanol, particularly preferably methanol. Examples of an initiator used for the polymerization may be known initiators, such as azo initiators and peroxide initiators including 2,2'-azobis(isobutyronitrile), 2,2'-azobis(4-methoxy-2,4-di methylvaleronitrile), 2,2'-azobis(2,4-dimethylvaleronitrile), benzoyl peroxide, n-propyl peroxydicarbonate, and the like.

In the polymerization, a chain transfer agent may coexist for adjustment of the viscosity-average degree of polymerization of the ethylene-vinyl ester copolymer thus obtained and the like. Examples of the chain transfer agent include aldehydes, such as acetaldehyde, propionaldehyde, butylaldehyde, and benzaldehyde; ketones, such as acetone, methyl ethyl ketone, hexanone, and cyclohexanone; mercaptans, such as 2-hydroxyethanethiol; thiocarboxylic acids, such as thioacetic acid; halogenated hydrocarbons, such as trichloroethylene and perchloroethylene; and the like. Among all, aldehydes and ketones are preferably used. The amount of the chain transfer agent depends on the chain transfer constant of the chain transfer agent to be added and a targeted viscosity-average degree of polymerization of the ethylene-vinyl ester copolymer (A), and it is generally from 0.1 to 10 parts by mass based on 100 parts by mass of the vinyl ester to be used.

The polymerization may be carried out by any of continuous polymerization, semi-batch polymerization, and batch polymerization, preferably continuous polymerization. Examples of a polymerization reactor include a continuous tank reactor, a batch reactor, a tube reactor, and the like, preferably a continuous tank reactor.

With reference to the drawings, a specific polymerization apparatus and the polymerization step using the apparatus are described below. FIG. 1 is a schematic view of a polymerization apparatus used in Example 1. The apparatus is a continuous tank reactor in which a polymerization vessel 1 is connected to a heat exchanger 2 via pipes 3 and 4. In the heat exchanger 2, the vinyl ester can be brought into countercurrent contact with ethylene.

A plurality of pipes 5, 6, 7 are connected to the polymerization vessel 1. The number and arrangement of the pipes are not limited to those illustrated in FIG. 1. Ethylene, the polymerization initiator, and the organic solvent are fed to the polymerization vessel 1 through these pipes. The ratio of the materials introduced into the polymerization vessel per unit time is preferably from 0.1 to 20 parts by mass for ethylene, from 1 to 100 parts by mass for the organic solvent, and from 0.00001 to 1 part by mass for the polymerization initiator based on 100 parts by mass of the vinyl ester. In some cases, the vinyl ester and the other monomers can be fed through these pipes. The reaction liquid in the polymerization vessel 1 is continuously discharged from a reaction liquid outlet pipe 9 connected to the bottom of the polymerization vessel 1.

In the polymerization vessel 1, a stirrer 8 having a wide paddle blade is placed as a stirring blade. The solution containing the vinyl ester is caused to contact the ethylene-containing gas while stirred with the wide paddle blade, thereby reacting ethylene with the vinyl ester to give an ethylene-vinyl ester copolymer.

Figure 2:
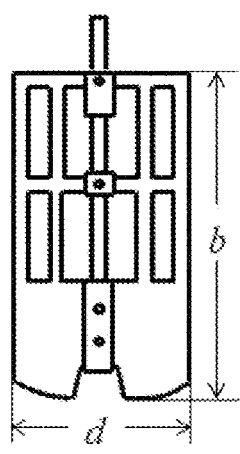
FIG. 2 is a schematic view of an exemplary wide paddle blade used in the present invention.
Figure 2:
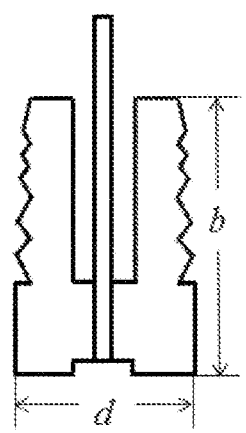
Figure 2:
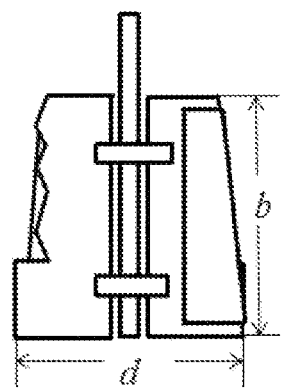
Figure 2:
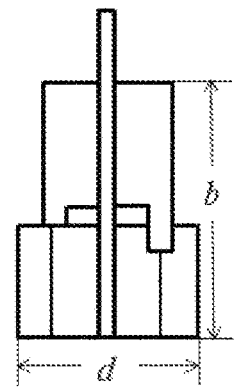

A wide paddle blade is preferably used as a stirring blade for stirring the solution containing the vinyl ester. FIG. 2 is a schematic view of an exemplary wide paddle blade used in the present invention. As illustrated in FIG. 2, the wide paddle blade is characterized in having a wide paddle with a width b. The width b of the wide paddle blade can be appropriately adjusted by the volume of the polymerization vessel 1 and the like, and is preferably from 1 to 10 m as described later. Use of such a paddle causes the solution to be homogeneously mixed from the bottom to the surface of the solution and also ethylene to be efficiently absorbed by the solution containing the vinyl ester. The wide paddle blade may be a single blade type (e.g., Maxblend blade) or a multi-blade type (e.g., Fullzone blade). In the light of further efficient absorption of ethylene by the vinyl ester, the surface level of the solution containing the vinyl ester is preferably near the upper end of the stirring blade while stirring the solution. Specific examples of the wide paddle blade include Maxblend blades (Sumitomo Heavy Industries Process Equipment Co., Ltd.), Fullzone blades (Kobelco Eco-Solutions Co., Ltd.), Sanmeler blades (Mitsubishi Heavy Industries, Ltd.), Hi-Fi mixer blades (Soken Chemical & Engineering Co., Ltd.), Supermix blade (Satake Chemical Equipment Mfg., Ltd., Supermix MR203, Supermix MR205), and Bendleaf blades (Hakko Sangyo Co., Ltd.).

An ethylene pressure in the polymerization vessel during a polymerization reaction is preferably from 0.01 to 0.9 MPa, more preferably from 0.05 to 0.8 MPa, and even more preferably from 0.1 to 0.7 MPa. A polymerization ratio of the vinyl ester at an outlet of a polymerization vessel is, but not limited to, preferably from 10% to 90% and more preferably from 15% to 85%.

The polymerization temperature is, but not limited to, preferably from 0° C. to 180° C., more preferably from 20° C. to 160° C., and even more preferably from 30° C. to 150° C.

While ethylene is reacted with a vinyl ester, the solution containing the vinyl ester is preferably stirred to have a stirring power Pv per unit volume from 0.5 to 10 kW/m$^3$ in the polymerization vessel. If the stirring power is less than 0.5 kW/m$^3$, the amount of ethylene incorporated in the vinyl ester is insufficient and the homogeneity of the reaction liquid is also insufficient, so that it is not possible to obtain the ethylene-vinyl alcohol copolymer (A) having a block character of the ethylene units within the above range. The stirring power is more preferably 1 kW/m$^3$ or more and even more preferably 1.5 kW/m$^3$ or more. If the stirring power is more than 10 kW/m$^3$, power used for operation becomes very large, which is industrially unfavorable. The stirring power is more preferably 7 kW/m$^3$ or less and even more preferably 5 kW/m$^3$ or less. The stirring power Pv per unit volume for the solution containing the vinyl ester is determined by a method described later in Examples.

The Froude number Fr is a ratio of inertial force to gravity defined by the following equation, which is an indicator of the vortex shape in the liquid surface.

$$Fr = n^2 \times d / g$$

n: rotation number (rps) of the stirring blade
d: stirring blade diameter (m)
g: gravity acceleration (m/s$^2$)

While ethylene is reacted with the vinyl ester, the solution containing the vinyl ester is preferably stirred to have a Froude number Fr from 0.05 to 0.2 in the polymerization vessel. By adjusting Froude number Fr within the above range to control the vortex shape in the liquid surface, ethylene is moderately absorbed by the vinyl ester and it is thus considered that the ethylene-vinyl alcohol copolymer (A) having a block character of the ethylene units within the above range is readily obtained. The Froude number Fr is more preferably 0.06 or more and even more preferably 0.07 or more. The Froude number Fr is more preferably 0.18 or less and even more preferably 0.15 or less. The Froude number Fr may be controlled within the above range by appropriately varying the rotation number n or the diameter d of the stirring blade.

The stirring blade diameter d of the wide paddle blade is not particularly limited as long as the stirring power Pv and the Froude number Fr are adjusted within the above ranges, and it is preferably from 0.5 to 5 m in the light of improving ethylene absorption efficiency. The stirring blade diameter d is more preferably 0.75 m or more. The stirring blade diameter d is more preferably 4 m or less. The stirring blade diameter d is twice the distance from a rotating shaft to the distal end of the blade (the farthest point from the rotating shaft).

The width b (length in the height direction) of the wide paddle blade (paddle) is not particularly limited and may be adjusted to the volume of the polymerization vessel 1 and the like, and it is preferably from 1 to 10 m in the light of improving the ethylene absorption efficiency. The width b is more preferably 1.5 m or more. The width b is more preferably 8 m or less.

A ratio of the width (paddle width) b to the stirring blade diameter d (b/d) of the wide paddle blade is not particularly limited and may be determined depending to the shape of the polymerization vessel 1 or the like, and it is preferably 1 or more in the light of improving the ethylene absorption efficiency. The ratio (b/d) is generally 2.5 or less.

The shape of the polymerization vessel 1 is generally, but not limited to, almost columnar. In this case, the wide paddle blade is arranged in the almost columnar polymerization vessel 1 such that the rotating shaft of the wide paddle blade is aligned with the rotation axis of the polymerization vessel 1. A ratio (d/D) of the stirring blade diameter d (m) to an inner diameter D (m) of the polymerization vessel is not particularly limited as long as the effects of the present invention are not impaired. The ratio may be appropriately adjusted depending on the polymerization vessel to be used, and generally from 0.4 to 0.9. The volume of the polymerization vessel is generally, but not limited to, from 1 to 200 kl.

The rotation number n of the stirring blade is not particularly limited as long as the stirring power Pv and the Froude number Fr are adjusted within the above ranges, and it is preferably from 0.5 to 1.35 rps. If the rotation number n is less than 0.5 rps, the polymerization solution tends to be supercooled near a heat transfer surface, so that a gelatinous material is sometimes formed on the inner wall of the polymerization vessel, leading to difficulty in long-term operation. If the rotation number n is more than 1.35 rps, use of a low-viscosity polymerization solution sometimes causes the solution to splash and adhere to the inner wall of the gas-phase portion in the polymerization vessel. If such a deposit is solidified and mixed into the polymerization solution, a foreign matter is formed and thus sometimes causes failure of stable operation.

Conventionally, in production of an ethylene-vinyl alcohol copolymer, a stirring power per unit volume, which is an indicator of agitation strength, has been controlled. Such a stirring power is, however, influenced by various factors, such as the volume, the viscosity, and the density of a reaction liquid, the shape of a polymerization vessel, and the shape and the rotation number of a stirring blade. Accordingly, it is difficult to highly control the blocking properties of the ethylene units only by controlling the stirring power, resultantly leading to extension of ethylene chains (blocking of ethylene units), and the block character of the ethylene units in the ethylene-vinyl alcohol copolymer thus obtained is less than 0.90. Furthermore, the extension of ethylene chains causes stronger intermolecular hydrophobic interaction, and thus the resulting aqueous emulsion used to have insufficient storage stability at low temperatures. As a result of intensive studies on this issue, the present inventors have found that a copolymer having shorter ethylene chains (ethylene units positioned at random) than those in the past is obtained by causing polymerization reaction to proceed under specific conditions and successfully improved the storage stability of the resulting aqueous emulsion at low temperatures.

In the light of more highly controlling the block character of the ethylene units, the above production method preferably comprises: the polymerization step using the polymerization vessel connected to the heat exchanger via a pipe; and the steps of, in production of the ethylene-vinyl ester copolymer, (b) introducing the ethylene-containing gas in the gas-phase portion of the polymerization vessel into the heat exchanger, (c) feeding the vinyl ester to the heat exchanger, (d) contacting the vinyl ester with the ethylene-containing gas in the heat exchanger, and (e) discharging the vinyl ester containing ethylene dissolved therein from the heat exchanger and introducing the vinyl ester into the polymerization vessel. The vinyl ester may be directly fed to the polymerization vessel not through the heat exchanger. However, as the method described above, ethylene is efficiently absorbed by the vinyl ester by causing the vinyl ester to absorb ethylene in the heat exchanger in advance and then to be fed to the polymerization vessel, thereby the block character of the ethylene units can be highly controlled. Although part of the vinyl ester to be fed to the polymerization vessel may be contacted with the ethylene-containing gas in the heat exchanger, the total amount of the vinyl ester to be fed is preferably contacted with the ethylene-containing gas in the heat exchanger.

Although the heat exchanger to be used is not particularly limited, a heat exchanger with a large surface area is preferred in the light of efficient absorption of ethylene. Examples include a vertical wetted-wall heat exchanger, a vertical wetted-wall multitubular heat exchanger, a heat exchanger equipped with a jacket and/or a coil in a packed column type, a porous plate type, or a bubble cap type absorber. Among these, a vertical wetted-wall multitubular heat exchanger is more preferred.

In the apparatus illustrated in FIG. 1, a vertical wetted-wall multitubular heat exchanger is used as the heat exchanger 2. To the heat exchanger 2, a vinyl ester inlet pipe 10 is connected to feed the vinyl ester to an upper portion of the heat exchanger 2 through this pipe. The starting vinyl ester may be a vinyl ester alone or a mixed solution of the organic solvent and a vinyl ester, and the latter is preferred.

To the heat exchanger 2 illustrated in FIG. 1, refrigerant pipes 11 and 12 are connected. The positions of the pipes are not limited to those illustrated in FIG. 1, and it is preferred to feed a refrigerant from the refrigerant pipe 12 connected to a lower portion of the heat exchanger 2 and discharge the refrigerant from the refrigerant pipe 11 connected to the upper portion of the heat exchanger 2. With such connections, it is possible to efficiently cool the vinyl ester, resulting in high ethylene absorption efficiency. Examples of the refrigerant include, but not particularly limited to: aqueous solutions of an alcohol, such as methanol, ethanol, ethylene glycol, and glycerol; aqueous solutions of sodium chloride and calcium chloride; Freons; and the like. For the reasons of handleability, costs, and the like, aqueous solutions of an alcohol, particularly aqueous solutions of methanol are preferably used.

A gas discharge pipe 13 for discharging gas from the heat exchanger 2 is connected to the upper portion of the heat exchanger 2. A mist separator (not shown) may be connected to the gas discharge pipe 13. Droplets in the discharged gas are removed by the mist separator to allow mist-free ethylene to be collected or released. Such a mist separator is an apparatus for separating droplets suspended in gas using external force, such as gravity, centrifugal force, and electrostatic force, or a shielding or sieving effect. Examples of the mist separator include a gravity settler, a cyclone, an electrostatic precipitator, a scrubber, a bag filter, and a packed bed. Among these, a cyclone is preferred.

The method of contacting the vinyl ester with the ethylene-containing gas in the heat exchanger 2 is not particularly limited. Examples of the method include: a method comprising flowing the vinyl ester down from the upper portion of the heat exchanger 2 while feeding a pressurized ethylene-containing gas to the lower portion of the heat exchanger 2, and thus bringing them into countercurrent contact in the heat exchanger 2; a method of flowing the vinyl ester down from the upper portion of the heat exchanger 2 while feeding a pressurized ethylene-containing gas to the upper portion of the heat exchanger 2, and thus bringing them into cocurrent contact in the heat exchanger 2; and the like. In the light of efficient ethylene absorption, the former is preferred.

In the apparatus shown in FIG. 1, the two pipes 3 and 4 connect the polymerization vessel 1 to the heat exchanger 2. The ethylene-containing gas is introduced from the polymerization vessel 1 through the pipe 3 to the lower portion of the heat exchanger 2, and the vinyl ester having absorbed ethylene is introduced from the lower portion of the heat exchanger 2 through the pipe 4 to the polymerization vessel 1.

The vinyl ester is fed through the inlet pipe 10 to the heat exchanger 2. The vinyl ester introduced into the upper portion of the heat exchanger 2 absorbs ethylene while passing through the heat exchanger 2.

The ethylene-containing gas is introduced through the pipe 3 connected to the lower portion of the heat exchanger 2 into the heat exchanger 2. The pipe 3 on the heat exchanger side is connected to the lower portion of the heat exchanger 2, while the vinyl ester inlet pipe 10 is connected to the upper portion of the heat exchanger 2. The ethylene-containing gas flows up in the heat exchanger 2 while being brought into countercurrent contact with the vinyl ester. As a result, ethylene in the gas is dissolved in the vinyl ester.

The vinyl ester having absorbed ethylene is introduced through the pipe 4 into the polymerization vessel 1. For continuous production, ethylene is circulated in the polymerization vessel 1, the heat exchanger 2, and the pipes 3 and 4. Part of ethylene is contained in the vinyl ester to be discharged from the reaction liquid outlet pipe 9. Therefore, ethylene is replenished via at least one of the pipes 5, 6, and 7 from an ethylene supply source connected to the polymerization vessel 1.

Saponification Step

The ethylene-vinyl alcohol copolymer (A) is produced by saponifying the ethylene-vinyl ester copolymer obtained in the polymerization step. In this procedure, the ethylene-vinyl ester copolymer is preferably saponified by alcoholysis or hydrolysis reaction in the presence of a catalyst in an organic solvent. Examples of the catalyst used in the saponification step include: basic catalysts, such as sodium hydroxide, potassium hydroxide, and sodium methoxide; and acidic catalysts, such as sulfuric acid, hydrochloric acid, and p-toluenesulfonic acid. Examples of the organic solvent used in the saponification step include, but not particularly limited to, alcohols, such as methanol and ethanol; esters, such as methyl acetate and ethyl acetate; ketones, such as acetone and methyl ethyl ketone; and aromatic hydrocarbons, such as benzene and toluene. They may be used alone or in combination of two or more. Among these, it is convenient and preferred to perform saponification reaction in the presence of sodium hydroxide as a basic catalyst using methanol or a mixed solution of methanol and methyl acetate as a solvent. The amount of the saponification catalyst is preferably from 0.001 to 0.5 as a molar ratio to the vinyl ester units in the ethylene-vinyl ester copolymer. The molar ratio is more preferably 0.002 or more. The molar ratio is more preferably 0.4 or less and even more preferably 0.3 or less.

After the saponification step, a pulverization step and a drying step may be conducted. The pulverization step may be divided into a preliminary pulverization step and a main pulverization step. After the saponification step, if necessary, a washing step may be further conducted to remove impurities, such as sodium acetate.

Compound Having Conjugated Double Bond

The aqueous emulsion of the present invention preferably further comprises a compound with a molecular weight of 1000 or less having a conjugated double bond. The content of the compound is more preferably from 0.000001 to 0.01 parts by mass based on 100 parts by mass of the ethylene-vinyl alcohol copolymer (A). Use of the compound improves the polymerization stability during preparation of the aqueous emulsion. Although the mechanism to improve the polymerization stability is not clearly understood, it is assumed to be because conjugated double bond moieties interact with the ethylene units in the ethylene-vinyl alcohol copolymer (A) in the polar solvent, thereby moderately inhibiting intermolecular interaction of the ethylene-vinyl alcohol copolymer (A) with each other, and it is thus possible to obtain an emulsion with fewer aggregates. The compound is preferably contained as a dispersant.

In the present invention, the compound with a molecular weight of 1000 or less having a conjugated double bond is preferably a compound having a conjugated double bond of aliphatic double bonds or a compound having a conjugated double bond of an aliphatic double bond and an aromatic ring. In the light of better polymerization stability during preparation of the aqueous emulsion, the former is more preferred. The molecular weight is 1000 or less, preferably 800 or less, and more preferably 500 or less.

The compound having a conjugated double bond of aliphatic double bonds is a compound having a conjugated double bond with a structure where carbon-carbon double bonds and carbon-carbon single bonds are alternately connected, wherein the number of the carbon-carbon double bonds is two or more. Specific examples include conjugated diene compounds with a conjugated structure where two carbon-carbon double bonds and one carbon-carbon single bond are alternately connected; conjugated triene compounds with a conjugated structure where three carbon-carbon double bonds and two carbon-carbon single bonds are alternately connected (e.g., 2,4,6-octatriene); conjugated polyene compounds with a conjugated structure where a more number of carbon-carbon double bonds and carbon-carbon single bonds are alternately connected; and the like. Among all, in the light of better polymerization stability during preparation of the aqueous emulsion, conjugated diene compounds are preferred. The compound with a molecular weight of 1000 or less having a conjugated double bond used in the present invention may contain independently a plurality of conjugated double bonds in one molecule; for example, compounds having three conjugated trienes in the same molecule, such as tung oil, may be included.

The compound with a molecular weight of 1000 or less having a conjugated double bond may have a functional group other than the conjugated double bond. Examples of such another functional group include: polar groups, such as carboxy groups and salts thereof, hydroxy groups, ester groups, carbonyl groups, ether groups, amino groups, dialkylamino groups, imino groups, amide groups, cyano groups, diazo groups, nitro groups, mercapto groups, sulfone groups, sulfoxide groups, sulfide groups, thiol groups, sulfonic acid groups and salts thereof, phosphoric acid groups and salts thereof, and a halogen atom; and nonpolar groups, such as phenyl groups. In the light of better polymerization stability during preparation of the aqueous emulsion, as such another functional group, polar groups are preferred, and carboxy groups and salts thereof and hydroxy groups are more preferred. Such another functional group may be directly bonded to a carbon atom in the conjugated double bond or bonded at a position away from the conjugated double bond. A multiple bond in such another functional group may be at a position conjugatable with the conjugated double bond; for example, 1-phenyl-1,3-butadiene having a phenyl group, sorbic acid having a carboxy group, and the like may be used as the compound having a conjugated double bond. The compound with a molecular weight of 1000 or less having a conjugated double bond may have an unconjugated double bond or an unconjugated triple bond.

Specific examples of the compound with a molecular weight of 1000 or less having a conjugated double bond include compounds having a conjugated double bond of aliphatic double bonds, such as 2,3-dimethyl-1,3-butadiene, 4-methyl-1,3-pentadiene, 1-phenyl-1,3-butadiene, sorbic acid, and myrcene; and compounds having a conjugated double bond of an aliphatic double bond and an aromatic ring, such as 2,4-diphenyl-4-methyl-1-pentene, α-methylstyrene polymers, and 1,3-diphenyl-1-butene.

The content of the compound with a molecular weight of 1000 or less having a conjugated double bond in the aqueous emulsion is preferably 0.000001 to 0.01 parts by mass based on 100 parts by mass of the ethylene-vinyl alcohol copolymer (A). The content is more preferably 0.000002 parts by mass or more, and even more preferably 0.000003 parts by mass or more. The content is more preferably 0.0075 parts by mass or less, even more preferably 0.005 parts by mass or less, and particularly suitably 0.0025 parts by mass or less.

In the present invention, a method of adding the compound with a molecular weight of 1000 or less having a conjugated double bond is not particularly limited. Examples include: 1) a method comprising adding the compound to the ethylene-vinyl ester copolymer, followed by saponification; 2) a method comprising adding the compound during saponification of the ethylene-vinyl ester copolymer; 3) a method of spraying a liquid containing the compound on the ethylene-vinyl alcohol copolymer (A); 4) a method comprising impregnating the ethylene-vinyl alcohol copolymer (A) with a liquid containing the compound, followed by drying; 5) a method comprising preparing an aqueous solution containing the ethylene-vinyl alcohol copolymer (A) and the compound, followed by drying; 6) a method comprising preparing an aqueous solution containing the ethylene-vinyl alcohol copolymer (A) and the compound and using the aqueous solution as an aqueous dispersant solution for emulsion polymerization; and the like. Among these, the methods 2) and 6) are preferred in the light of the ease of adjusting the content of the compound.

Polymer (B)

The aqueous emulsion of the present invention is an aqueous emulsion comprising: the ethylene-vinyl alcohol copolymer (A) as a dispersant; and a polymer (B) containing an unsaturated ethylenic monomer unit as a dispersoid.

Examples of the unsaturated ethylenic monomer include:
vinyl ester monomers, such as vinyl formate, vinyl acetate, vinyl propionate, and vinyl versatate;
(meth)acrylic acid monomers, such as acrylic acid and methacrylic acid;
(meth)acrylic ester monomers, such as methyl acrylate, ethyl acrylate, butyl acrylate, 2-ethylhexyl acrylate, dodecyl acrylate, 2-hydroxyethyl acrylate, methyl methacrylate, ethyl methacrylate, butyl methacrylate, 2-ethylhexyl methacrylate, dodecyl methacrylate, 2-hydroxyethyl methacrylate, dimethylaminoethyl acrylate and quaternary compounds thereof, and dimethylaminoethyl methacrylate and quaternary compounds thereof;
styrene monomers, such as styrene, α-methylstyrene, p-styrenesulfonic acid, and sodium salts and potassium salts thereof;
diene monomers, such as butadiene, isoprene, and chloroprene;
olefin monomers, such as ethylene, propylene, and isobutylene;
acrylamide monomers, such as acrylamide, methacrylamide, N-methylolacrylamide, N,N-dimethylacrylamide, and acrylamide-2-methylpropanesulfonic acid and sodium salts thereof;
halogenated olefins, such as vinyl chloride, vinyl fluoride, vinylidene chloride, and vinylidene fluoride;
N-vinylpyrrolidone; and the like. Among all, the polymer (B) is preferably a polymer containing monomer units derived from at least one selected from the group consisting of a vinyl ester monomer, a (meth)acrylic ester monomer, a styrene monomer, and a diene monomer. The total content of the vinyl ester monomer, the (meth)acrylic ester monomer, the styrene monomer, and the diene monomer is preferably 70 mass % or more and more preferably 75 mass % or more based on the total monomer units of the polymer (B). Among all, the polymer (B) particularly preferably contains 75 mass % or more of the vinyl ester monomer units based on the total monomer units.

In the aqueous emulsion of the present invention, a mass ratio (A)/(B) of the ethylene-vinyl alcohol copolymer (A) to the polymer (B) is preferably, but not particularly limited to, from 2/98 to 40/60. When the mass ratio (A)/(B) is 2/98 or more, the aqueous emulsion tends to have excellent viscosity stability. The mass ratio (A)/(B) is more preferably 5/95 or more. When the mass ratio (A)/(B) is 40/60 or less, a film thus obtained tends to have excellent water resistance. The mass ratio (A)/(B) is more preferably 20/80 or less.

In the light of excellent viscosity stability, the total content of the ethylene-vinyl alcohol copolymer (A) and the polymer (B) in the aqueous emulsion is preferably 5 mass % or more, more preferably 10 mass % or more, even more preferably 20 mass % or more, particularly preferably 30 mass % or more, and most preferably 35 mass % or more. Meanwhile, in the light of long open time and excellent handleability, the total content is preferably 60 mass % or less and more preferably 55 mass % or less.

The aqueous emulsion of the present invention preferably has a solid content of 30 mass % or more and more preferably 35 mass % or more. Meanwhile, the solid content is preferably 60 mass % or less and more preferably 55 mass % or less. When the solid content is 30 mass % or more, the aqueous emulsion tends to have excellent viscosity stability. Meanwhile, when the solid content is 60 mass % or less, the aqueous emulsion tends to provide long open time and excellent handleability.

Method of Producing Aqueous Emulsion

An example of the method of producing the aqueous emulsion of the present invention includes a method comprising emulsion polymerizing the unsaturated ethylenic monomer using a polymerization initiator in the presence of the dispersant containing the ethylene-vinyl alcohol copolymer (A). The aqueous emulsion thus obtained is excellent in stability at low temperatures and water-resistant adhesiveness.

In the above method, when the dispersant is charged into the polymerization vessel, methods of charging and adding the dispersant are not particularly limited. Examples include a method comprising initially adding the dispersant in bulk into the polymerization vessel and a method comprising continuously adding the dispersant during polymerization. Among all, in the light of increasing a ratio of grafting the ethylene-vinyl alcohol copolymer (A) to the unsaturated ethylenic monomer, the method comprising initially adding the dispersant in bulk into the polymerization vessel is preferred. In this situation, a preferred method comprises: adding the dispersant to cold water or warm water heated in advance; and heating and stirring at a temperature from 80° C. to 90° C. for homogeneous dispersion of the dispersant.

In the emulsion polymerization, the amount of the dispersant is preferably from 0.2 to 40 parts by mass based on 100 parts by mass of the unsaturated ethylenic monomer, more preferably from 0.3 to 20 parts by mass, and even more preferably from 0.5 to 15 parts by mass. When the amount of the dispersant is the lower limit or more, aggregation of dispersoid particles is less likely to be formed in the aqueous emulsion and thus the polymerization stability tends to be excellent during preparation of the aqueous emulsion. When the amount of the dispersant is the upper limit or less, the viscosity of the polymerization liquid is not too high, leading to a tendency of causing the polymerization to proceed homogeneously and efficiently removing the heat of polymerization.

As the polymerization initiator in the emulsion polymerization, it is possible to use water-soluble single initiators or water-soluble redox initiators generally used for emulsion polymerization. One type of these initiators may be used singly or two or more types of them may be used together. Among all, redox initiators are preferred.

Examples of the water-soluble single initiators include: azo initiators; peroxides, such as hydrogen peroxide and persulfates (potassium, sodium, and ammonium salts); and the like. Examples of the azo initiators include 2,2'-azobis (isobutyronitrile), 2,2'-azobis(2,4-dimethylvaleronitrile), 2,2'-azobis(4-methoxy-2,4-dimethylvaleronitrile), and the like.

As the redox initiator, it is possible to use those obtained by combining an oxidant with a reducing agent. Such an oxidant is preferably a peroxide. Examples of the reducing agent include metal ions, reducing compounds, and the like. Examples of the combinations of the oxidant with the reducing agent include combination of a peroxide with a metal ion, combination of a peroxide with a reducing compound, and combination of a peroxide with a metal ion and a reducing compound. Examples of the peroxide include: hydroxyperoxides, such as hydrogen peroxide, cumene hydroxyperoxide, and t-butyl hydroxyperoxide; persulfates (potassium, sodium, and ammonium salts); t-butyl peracetate; peracid esters (t-butyl perbenzoate); and the like. Examples of the metal ion include metal ions, such as $Fe^{2+}$, $Cr^{2+}$, $V^{2+}$, $Co^{2+}$, $Ti^{3+}$, and $Cu^+$, capable of undergoing one-electron transfer. Examples of the reducing compound include sodium hydrogen sulfite, sodium hydrogen carbonate, tartaric acid, fructose, dextrose, sorbose, inositol, Rongalite, and ascorbic acid. Among them, combination of one or more oxidants selected from the group consisting of hydrogen peroxide, potassium persulfate, sodium persulfate, and ammonium persulfate with one or more reducing agents selected from the group consisting of sodium hydrogen sulfite, sodium hydrogen carbonate, tartaric acid, Rongalite, and ascorbic acid is preferred, and combination of hydrogen peroxide with one or more reducing agents selected from the group consisting of sodium hydrogen sulfite, sodium hydrogen carbonate, tartaric acid, Rongalite, and ascorbic acid is more preferred.

In the emulsion polymerization, alkali metal compounds, surfactants, buffers, polymerization regulators, and the like may be appropriately used as long as the effects of the present invention are not impaired.

Examples of the alkali metal compounds include, but not particularly limited to, compounds containing sodium, potassium, rubidium, cesium, and the like. The alkali metal compounds may be alkali metal ions themselves or compounds containing alkali metal.

In the case of using the alkali metal compounds, the content (in terms of alkali metal) may be appropriately selected in accordance with the type of alkali metal compound and is preferably from 100 to 15000 ppm based on the total solid content of the aqueous emulsion, more preferably from 120 to 12000 ppm, and even more preferably from 150 to 8000 ppm. When the alkali metal compound content is 100 ppm or more, the emulsion polymerization tends to have excellent stability during preparation of the aqueous emulsion. When the content is 15000 ppm or less, a film formed from the aqueous emulsion is less likely to be colored. It should be noted that the alkali metal compound content may be measured with an ICP emission spectrometer. The term "ppm" herein means "mass ppm".

Specific examples of the compounds containing alkali metal include weak base alkali metal salts (e.g., alkali metal carbonate, alkali metal acetate, alkali metal bicarbonate, alkali metal phosphate, alkali metal sulfate, alkali metal halide salt, alkali metal nitrate), strong base alkali metal compounds (e.g., hydroxide of alkali metal, alkoxide of alkali metal), and the like. One type of these alkali metal compounds may be used singly or two or more types of them may be used together.

Examples of the weak base alkali metal salts include alkali metal carbonates (e.g., sodium carbonate, potassium carbonate, rubidium carbonate, cesium carbonate), alkali metal bicarbonates (e.g., sodium hydrogen carbonate, potassium hydrogen carbonate, etc.), alkali metal phosphates (sodium phosphate, potassium phosphate, etc.), alkali metal carboxylates (sodium acetate, potassium acetate, cesium acetate, etc.), alkali metal sulfates (sodium sulfate, potassium sulfate, cesium sulfate, etc.), alkali metal halide salts (cesium chloride, cesium iodide, potassium chloride, sodium chloride, etc.), and alkali metal nitrates (sodium nitrate, potassium nitrate, cesium nitrate, etc.). Among them, in the light of giving basicity to the aqueous emulsion, alkali metal carboxylates, alkali metal carbonates, and alkali metal bicarbonates, which are capable of behaving as weak acid-strong base salt, are preferred and alkali metal carboxylates are more preferred.

Use of such a weak base alkali metal salt causes the weak base alkali metal salt to act as a pH buffer in the emulsion polymerization and thus allows the emulsion polymerization to stably proceed.

As such a surfactant, any of nonionic surfactants, anionic surfactants, and cationic surfactants may be used. Examples of the nonionic surfactant include, but not particularly limited to, polyoxyethylene alkyl ether, polyoxyethylene alkylphenyl ether, polyoxyethylene fatty acid ester, polyoxyalkylene alkyl ether, polyoxyethylene derivatives, sorbitan fatty acid ester, polyoxyethylene sorbitan fatty acid ester, polyoxyethylene sorbitol fatty acid ester, glycerol fatty acid ester, and the like. Examples of the anionic surfactant include, but not particularly limited to, alkyl sulfate, alkylaryl sulfate, alkyl sulphonate, sulfate of hydroxyalkanol, sulfosuccinic acid ester, sulfate and phosphate of alkyl or alkylaryl polyethoxyalkanol, and the like. Examples of the cationic surfactant include, but not particularly limited to, alkylamine salt, quaternary ammonium salt, polyoxyethylene alkylamine, and the like. The amount of the surfactant is preferably 2 parts by mass or less based on 100 parts by mass of the unsaturated ethylenic monomer (e.g., vinyl acetate). The amount of the surfactant of more than 2 parts by mass is not preferred because of sometimes causing decrease in water resistance, hot water resistance, and boiling resistance.

Examples of the buffer include: acids, such as acetic acid, hydrochloric acid, and sulfuric acid; bases, such as ammonia, amine, caustic soda, caustic potash, and calcium hydroxide; alkali carbonate; phosphate; acetate; and the like. Examples of the polymerization regulator include mercaptans, alcohols, and the like.

The dispersion medium used for the emulsion polymerization is preferably an aqueous medium containing water as the main component. The aqueous medium containing water as the main component may contain a water-soluble organic solvent (alcohols, ketones, etc.) soluble in water at an arbitrary ratio. The "aqueous medium containing water as the main component" used herein refers to a dispersion medium containing 50 mass % or more of water. In the light of costs and environmental loads, the dispersion medium is preferably an aqueous medium containing 90 mass % or more of water, and water is more preferred. In the method of producing the aqueous emulsion, it is preferred that the dispersion medium containing the ethylene-vinyl alcohol copolymer (A) is heated before initiating emulsion polymerization to dissolve the ethylene-vinyl alcohol copolymer (A), followed by cooling and purging the solution with nitrogen. The heating temperature is preferably 80° C. or more. The temperature of the emulsion polymerization is, but not particularly limited to, preferably approximately from 20° C. to 85° C. and more preferably approximately from 40° C. to 85° C.

Aliphatic Alcohol (C)

In the light of improving applicability of the aqueous emulsion to adherends, the aqueous emulsion preferably further comprises an aliphatic alcohol (C). Examples of the method of adding the aliphatic alcohol (C), but not particularly limited to, include a method comprising adding in bulk into the polymerization vessel in advance, a method comprising continuously adding the aliphatic alcohol (C) during the emulsion polymerization, a method comprising adding the aliphatic alcohol (C) in bulk to the aqueous emulsion obtained by emulsion polymerization, and the like.

The content of the aliphatic alcohol (C) is preferably from 0.0001 to 1 part by mass based on 100 parts by mass of the ethylene-vinyl alcohol copolymer (A) and more preferably from 0.001 to 1 part by mass. The content of the aliphatic alcohol (C) in such a range improves the applicability of the aqueous emulsion to adherends. The content of the aliphatic alcohol (C) of 1 part by mass or less tends to have excellent water resistance.

The aliphatic alcohol (C) is an aliphatic alcohol other than the ethylene-vinyl alcohol copolymer (A), and specific examples include aliphatic monoalcohols, aliphatic polyalcohols, and the like.

Examples of the aliphatic monoalcohol include methanol, ethanol, 1-propanol, 2-propanol, 1-butanol, 2-butanol, 2-methyl-1-propanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, 3-methoxy-3-methyl-1-butanol, 1-hexanol, 2-hexanol, 3-hexanol, 2-ethylhexanol, 2-methyl-1-pentanol, 3-methyl-1-pentanol, 4-methyl-1-pentanol, 2-methyl-2-pentanol, 3-methyl-2-pentanol, 4-methyl-2-pentanol, and the like.

Examples of the aliphatic polyalcohol include diols (e.g., ethylene glycol, propylene glycol, 1,3-propanediol, 1,3-butanediol, 1,4-butanediol, 1,5-pentanediol, 1,2-hexanediol, 1,6-hexanediol, etc.), tri- to tetra-hydric polyalcohols (glycerol, trimethylolpropane, pentaerythritol, 1,2,6-hexanetriol, diglycerol, etc.), and the like. The aliphatic polyalcohol is preferably a di- to tetra-hydric aliphatic alcohol, more preferably a di- to tri-hydric aliphatic alcohol, and even more preferably a trihydric aliphatic alcohol.

Among all, as the aliphatic alcohol (C), glycerol and methanol are preferred and glycerol is more preferred.

The aqueous emulsion may contain various additives as long as the effects of the present invention are not impaired. Examples of such an additive include organic solvents (aromatic compounds, such as toluene and xylene, alcohols, ketones, esters, halogen-containing solvents, etc.), cross-linking agents, plasticizers, suspending agents, thickeners, fluidity modifiers, preservatives, defoamers, fillers, wetting agents, colorants, binders, water retention agents, and the like. One type of them may be used singly or two or more types of them may be used together. The aqueous emulsion may be obtained by adding an aqueous emulsion containing a compound, as a dispersant, other than the ethylene-vinyl alcohol copolymer (A) to the aqueous emulsion containing the ethylene-vinyl alcohol copolymer (A) as a dispersant and the polymer (B) as a dispersoid. The total of the additives other than the ethylene-vinyl alcohol copolymer (A), the polymer (B), the aliphatic alcohol (C), the compound with a molecular weight of 1000 or less having a conjugated double bond, the dispersion medium, the alkali metal compound, and the surfactant in the aqueous emulsion is preferably 30 mass % or less, more preferably 10 mass % or less, even more preferably 5 mass % or less, particularly preferably 3 mass % or less, and most preferably 1 mass % or less.

Adhesive

An adhesive comprising the aqueous emulsion of the present invention is a preferred embodiment of the present invention.

Examples of an adherend for the adhesive of the present invention include paper, wood, plastics, and the like, and wood is particularly preferred. The adhesive of the present invention is preferably used for applications, such as laminated wood, plywood, decorated plywood, and fiberboard. The adhesive is also preferably used for woodworking and paper processing (e.g., for forming paper tubes and paper straws).

The aqueous emulsion of the present invention is also preferably used for paints and fiber treatment. The aqueous emulsion is applicable to a wide variety of use, such as binders for inorganic materials, cement admixtures, and mortar primers. Moreover, so-called powder emulsion produced by powdering the aqueous emulsion thus obtained by spray drying and the like is also effectively used.

EXAMPLES

With reference to Examples, the present invention will then be described more specifically, but the present invention is not at all limited to these Examples. It should be noted that "%" and "part(s)" in Examples and Comparative Examples below respectively refer to "mass %" and "part(s) by mass" unless otherwise specified.

Viscosity-Average Degree of Polymerization and Degree of Saponification of Ethylene-Vinyl Alcohol Copolymer The viscosity-average degree of polymerization and the degree of saponification of the ethylene-vinyl alcohol copolymer were determined in accordance with the method described in JIS K6726 (1994).

Block Character of Ethylene Units of Ethylene-Vinyl Alcohol Copolymer

The ethylene-vinyl alcohol copolymer was saponified to a degree of saponification of 99.9 mol % or more, followed by thorough washing with methanol and then drying at 90° C. under reduced pressure for 2 days. The copolymer thus obtained was dissolved in DMSO-$d_6$ and analyzed by 600 MHz $^{13}$C-NMR at 80° C. Using the molar fraction of vinyl alcohol-ethylene two-unit chains (AE), the molar fraction of the vinyl alcohol units (A), and the molar fraction of the ethylene units (E) assigned and calculated from the obtained spectrum as described in T. Moritani and H. Iwasaki, 11, 1251-1259, Macromolecules (1978), the block character (η) of the ethylene units was determined according to the following equation:

$$\eta = (AE)/\{2\times(A)\times(E)\}$$

The polymerization stability during preparation of the aqueous emulsion, and the storage stability at low temperatures, the water-resistant adhesiveness, and the applicability to adherends of the aqueous emulsion were evaluated by the following methods.

(1) Polymerization Stability

The polymerization stability was evaluated by measuring the aggregate content. Through a 60-mesh metal sieve, 500 g of each aqueous emulsion obtained in Examples and Comparative Examples was filtered, and the filtration residue was weighed to evaluate as follows.

A: the filtration residue was 1.0 mass % or less.
B: the filtration residue was more than 1.0 mass % and 2.5 mass % or less.
C: the filtration residue was more than 2.5%.
D: there was a large quantity of the filtration residue and it was difficult to be filtered.

(2) Storage Stability at Low Temperatures

In a glass container, 90 g of each aqueous emulsion obtained in Examples and Comparative Examples was sealed to be stored in a thermostat at 5° C. A ratio of viscosity $\eta_2$ 2 weeks after starting the storage to viscosity no 5 hours after was calculated and the stability was evaluated in accordance with the following criteria.

A: $0.9 < \eta_2/\eta_0 < 1.4$
B: $1.4 \leq \eta_2/\eta_0 < 3.0$
C: $\eta_2/\eta_0 \leq 0.9$ or $3.0 \leq \eta_2/\eta_0$
D: the emulsion became gelatinous and lost the fluidity.

(3) Water-Resistant Adhesiveness

The water-resistant adhesiveness was evaluated in accordance with EN204.

Adhesion Conditions
Adherend: beech/beech
Spread: 200 g/m$^2$
Pressing Conditions: 20° C., 2 hours, pressure of 0.7 N/mm$^2$ Measurement Conditions After adhesion, the adhered article thus obtained was immersed in water at 20° C. for 4 days and then, remained in the wet condition, the adhesive strength (unit: N/mm$^2$) was measured.

(4) Applicability to Adherends

On a birch wood with a width of 25 mm and a length of 20 cm, 0.8 g of the aqueous emulsion was dropped and rubbed 4 times with a rubber roller to observe the situation. The applicability was evaluated in accordance with the following criteria.

A: the adhesive was homogeneously applied on the entire upper surface of the birch wood and no aggregates were produced.
B: the adhesive was homogeneously applied on the upper surface of the birch wood in an area at an area ratio of ½ or more, and no aggregates were produced and the adhesive layer did not peel.
C: the adhesive was applied on the upper surface of the birch wood in an area at an area ratio of ½ or more, and aggregates were produced and also the adhesive layer peeled.
D: the adhesive was applied on the upper surface of the birch wood in an area at an area ratio of less than 1/2, and aggregates were produced and also the adhesive layer peeled.

Example 1

Production of Copolymer (A-1)

FIG. 1 illustrates a schematic view of the polymerization apparatus used. Into an almost columnar polymerization vessel 1 [volume: 7 kl, vessel inner diameter D: 1.8 m] equipped with a Maxblend blade [from Kobelco Eco-Solutions Co., Ltd., stirring blade diameter (diameter) d: 1.1 m, blade (paddle) width b: 1.5 m] as a stirring blade 8, ethylene was introduced from a pipe 5 to have an inner ethylene pressure of 0.23 MPa and also a 1 mass % solution of 2,2'-azobis-(4-methoxy-2,4-dimethylvaleronitrile) as a polymerization initiator in methanol was introduced at a rate of 3 L/hr from a pipe 6. Furthermore, via an inlet pipe 10 and a heat exchanger 2, a vinyl acetate containing solution (vinyl acetate: 777 L/hr, methanol: 170 L/hr) was introduced into the polymerization vessel 1. The ethylene-containing gas was introduced from the polymerization vessel 1 through a pipe 3 into the heat exchanger 2. The vinyl acetate containing solution absorbed ethylene by flowing down along the pipe surface and poured into the polymerization vessel 1 via a pipe 4 to be mixed with the reaction liquid and subjected to continuous polymerization with ethylene. The polymerization liquid was continuously removed through a pipe 9 to keep the liquid surface in the polymerization vessel 1 at a constant level. The conditions were regulated to have the polymerization ratio of vinyl acetate at the outlet of the polymerization vessel 1 at 30%. In addition, the conditions were regulated to have the stirring power Pv per unit volume of 2.2 kW/m$^3$ and the Froude number Fr of 0.13. The reaction liquid was stirred in the state where the entire blade (paddle) was immersed in the reaction liquid and also the surface level of the liquid was close to the upper end of the blade (paddle). The residence time of the reaction liquid in the polymerization vessel was 5 hours. The temperature at the outlet of the polymerization vessel was 60° C. Methanol vapor was introduced into the continuously removed polymerization liquid to remove the unreacted vinyl acetate monomer and thus to obtain a solution of an ethylene-vinyl acetate copolymer in methanol (concentration of 32%).

To the solution of an ethylene-vinyl acetate copolymer in methanol (concentration of 32%) obtained in the above polymerization step, a solution of sodium hydroxide as a saponification catalyst in methanol (concentration of 4 mass %) was added to have a molar ratio of sodium hydroxide to the vinyl acetate units in the ethylene-vinyl acetate copolymer of 0.012. Based on 100 parts by mass of the ethylene-vinyl acetate copolymer, 0.00009 parts by mass in terms of solid contents of a solution of sorbic acid in methanol (concentration of 10 mass %) was further added, and the mixture thus obtained was mixed with a static mixer and then placed on a belt to be retained at 40° C. for 18 minutes for proceeding of saponification reaction. Subsequently, the mixture was pulverized and dried to give an ethylene-vinyl alcohol copolymer (A-1) (hereinafter, referred to as a copolymer (A-1)). The copolymer (A-1) thus obtained had an ethylene unit content of 2 mol %, a viscosity-average degree of polymerization of 1700, a degree of saponification of 98.5 mol %, and a block character of the ethylene units of 0.95, and the content of the compound having a conjugated double bond was 0.00018 parts by mass based on 100 parts by mass of the ethylene-vinyl alcohol copolymer.

Production of Aqueous Emulsion

Into a 1-liter glass polymerization vessel equipped with a reflux condenser, a dropping funnel, a thermometer, and a nitrogen inlet port, 275 g of ion exchange water was charged and heated at 85° C. In the ion exchange water, 19.5 g of the copolymer (A-1) was dispersed and stirred for 45 minutes to be dissolved. Further, 0.3 g of sodium acetate was added and mixed to be dissolved. The aqueous solution of the copolymer (A-1) dissolved therein was then cooled and purged with nitrogen, followed by raising the temperature to 60° C. while stirring at 200 rpm. Then, 2.4 g of a 20 mass % aqueous solution of tartaric acid and 3.2 g of a 5 mass % hydrogen peroxide solution were added in shots, and then 0.02 g of glycerol and 27 g of vinyl acetate were charged to initiate polymerization. Completion of the initial polymerization was confirmed (the amount of residual vinyl acetate was less than 1%) 30 minutes after initiating the polymerization. Then, 1 g of a 10 mass % aqueous solution of tartaric acid and 3.2 g of a 5 mass % hydrogen peroxide solution were added in shots, and then 251 g of vinyl acetate was continuously added for 2 hours. The polymerization temperature was maintained at 80° C. and the polymerization was completed to obtain an aqueous polyvinyl acetate-based emulsion (Em-1) with a solid content concentration of 49.8 mass %.

Examples 2 Through 5 and Comparative Examples 1 Through 4

Production of Copolymers (A-2), (A-3), (A-5), and (A-6) and PVA-7

Ethylene-vinyl alcohol copolymers (copolymers (A-2), (A-3), (A-5), and (A-6)) and a polyvinyl alcohol (PVA-7) were produced in the same method as that in Example 1 except for changing: during polymerization, the feeding amounts and the polymerization ratios of ethylene, vinyl acetate, methanol, and the initiator, the type of the stirring blade, the stirring power Pv, the Froude number Fr; and during saponification, the concentration of the ethylene-vinyl ester copolymer solution, the molar ratio of sodium hydroxide, and the type and the amount of the compound containing a conjugated double bond. Table 1 collectively shows the polymerization conditions and the saponification conditions during production, the degrees of polymerization, the degrees of saponification, the ethylene units, and the block characters of the polymers thus obtained, and the types and the contents of the compounds containing a conjugated double bond.

Production of Copolymer (A-4)

Into a polymerization vessel 1 [volume: 7 kl, vessel inner diameter D: 1.8 m] equipped with a two-stage inclined paddle blade [stirring blade diameter (diameter) d: 1.5 m, blade (paddle) width b: 0.88 m] as the stirring blade 8, ethylene was introduced from the pipe 5 to have an inner ethylene pressure of 0.61 MPa and also a 1 mass % solution of 2,2'-azobis-(4-methoxy-2,4-dimethylvaleronitrile) as a polymerization initiator in methanol was introduced at a rate of 9 L/hr from the pipe 6. Furthermore, from an inlet pipe 7, a vinyl acetate containing solution (vinyl acetate: 751 L/hr, methanol: 190 L/hr) was introduced into the polymerization vessel 1. The polymerization liquid was continuously removed through the pipe 9 to keep the liquid surface in the polymerization vessel 1 at a constant level. The conditions were regulated to have the polymerization ratio at the outlet of the polymerization vessel 1 at 43%. In addition, the conditions were regulated to have the stirring power Pv of 2 kW/m$^3$ and the Froude number Fr of 0.18. The residence time of the reaction liquid in the polymerization vessel was 5 hours. The temperature at the outlet of the polymerization vessel was 60° C. Methanol vapor was introduced into the continuously removed polymerization liquid to remove the unreacted vinyl acetate monomer and thus to obtain a solution of an ethylene-vinyl acetate copolymer (A-4) in methanol (concentration of 40%). The ethylene-vinyl alcohol copolymer (A-4) was produced by performing a saponification step in the same method as that in Example 1 except for changing the concentration of the ethylene-vinyl ester copolymer solution and the molar ratio of sodium hydroxide. Table 1 collectively shows the polymerization conditions and the saponification conditions during production, the degree of polymerization, the degree of saponification, the ethylene units, and the block character of the polymer thus obtained, and the type and the content of the compound containing a conjugated double bond.

Production of Aqueous Emulsion

As shown in Table 2, aqueous emulsions were prepared in the same manner as in Example 1 except for using predetermined amounts of copolymers (A-2) through (A-5) and PVA-7 instead of the copolymer (A-1) in Example 1 and changing the types and the contents of the aliphatic alcohol (C). Table 2 collectively shows the results of evaluating the storage stability at low temperatures, the water-resistant adhesiveness, and the applicability to adherends of the aqueous emulsions thus obtained in accordance with the methods described above. It should be noted that a copolymer (A-6) was insoluble in water and it was not possible to obtain an aqueous emulsion.

TABLE 1

| | Polymerization Conditions | | | | | | | | |
|---|---|---|---|---|---|---|---|---|---|
| Type | Ethylene Mpa | Vinyl Acetate L/hr | Methanol L/hr | Initiator L/hr | Polymerization Ratio % | Stirring Blade | Pv kW/m$^3$ | Fr | Supply of Vinyl Acetate |
| A-1 | 0.23 | 777 | 170 | 3 | 30 | Maxblend Blade | 2.2 | 0.13 | Heat Exchanger |
| A-2 | 0.47 | 820 | 128 | 2.5 | 28 | Maxblend Blade | 3 | 0.11 | Heat Exchanger |
| A-3 | 0.69 | 682 | 185 | 82.6 | 70 | Maxblend Blade | 1.9 | 0.1 | Heat Exchanger |
| A-4 | 0.61 | 751 | 190 | 9 | 43 | Two-Stage Inclined Paddle Blade | 2 | 0.18 | Direct |
| A-5 | 0.1 | 745 | 2 | 202.7 | 78 | Maxblend Blade | 6.9 | 0.21 | Heat Exchanger |
| A-6 [3] | 1.77 | 735 | 174 | 41 | 50 | Anchor Blade | 1.8 | 0.17 | Heat Exchanger |
| PVA-7 | 0 | 700 | 280 | 2.5 | 35 | Maxblend Blade | 2.1 | 0.14 | Heat Exchanger |

| | Saponification Conditions | | Ethylene-Vinyl Alcohol Copolymer (A) | | | | Compound Containing Conjugated Double Bond | |
|---|---|---|---|---|---|---|---|---|
| | PVAc Concentration mass % | NaOH Molar Ratio | Ethylene Units (mol %) | Degree of Polymerization | Degree of Saponification (mol %) | Block Character | Type [1] | Content [2] (parts by mass) |
| A-1 | 32 | 0.012 | 2 | 1700 | 98.5 | 0.95 | SA | $1.8 \times 10^{-4}$ |
| A-2 | 30 | 0.012 | 4 | 1700 | 98.5 | 0.97 | SA | $1.8 \times 10^{-4}$ |
| A-3 | 45 | 0.015 | 10 | 400 | 98 | 0.98 | — | — |

TABLE 1-continued

| | | | | | | | | |
|---|---|---|---|---|---|---|---|---|
| A-4 | 40 | 0.02 | 6 | 1000 | 99.2 | 0.85 | SA | $1.8 \times 10^{-4}$ |
| A-5 | 45 | 0.008 | 2 | 500 | 88 | 1.01 | SA | $1.8 \times 10^{-4}$ |
| A-6 [3] | 40 | 0.03 | 22 | — | — | 0.99 | — | — |
| PVA-7 | 30 | 0.01 | 0 | 1700 | 98.5 | — | DPMP | $40 \times 10^{-4}$ |

[1] SA: Sorbic Acid, DPMP: 2,4-diphenyl-4-methyl-1-pentene
[2] Content of Compound having Conjugated Double Bond based on 100 parts by mass of Ethylene-Vinyl Alcohol Copolymer
[3] The ethylene-vinyl alcohol copolymer thus obtained was insoluble in water.

TABLE 2

| | Aqueous Emulsion | | | | | | | Evaluation | | | |
|---|---|---|---|---|---|---|---|---|---|---|---|
| | Copolymer (A) | | | | | aliphatic alcohol (C) | | | Storage | | Water-Resistant |
| | Type | Content [1] (parts by mass) | (Dispersoid) (B) | (A)/(B) | Solid Contents (mass %) | Type | Content [2] (parts by mass) | Polymerization Stability | Stability at Low Temperatures | Applicability | Adhesiveness EN204 (N/mm$^2$) |
| Example 1 | A-1 | 7.0 | PVAc | 6.5/93.5 | 50 | glycerol | 0.1 | A | A | A | 1.0 |
| Example 2 | A-2 | 7.5 | PVAc | 7.0/93.0 | 50 | glycerol | 0.1 | A | A | A | 2.2 |
| Example 3 | A-2 | 7.5 | PVAc | 7.0/93.0 | 50 | — | — | A | A | C | 2.3 |
| Example 4 | A-2 | 7.5 | PVAc | 7.0/93.0 | 50 | MeOH | 0.05 | A | A | A | 1.9 |
| Example 5 | A-3 | 10.0 | PVAc | 9.1/90.9 | 50 | MeOH | 0.05 | C | C | A | 2.6 |
| Comparative Example 1 | A-4 | 9.0 | PVAc | 8.3/91.7 | 50 | MeOH | 0.1 | B | D | A | 1.9 |
| Comparative Example 2 | A-5 | 9.0 | PVAc | 8.3/91.7 | 50 | i-PrOH | 0.1 | B | A | A | 0.2 |
| Comparative Example 3 | A-5 | 9.0 | PVAc | 8.3/91.7 | 50 | — | — | B | A | B | 0.3 |
| Comparative Example 4 | PVA-7 | 7.5 | PVAc | 7.0/93.0 | 50 | — | — | C | B | D | 0.1 |

[1] Content based on 100 parts by mass of Dispersoid (B)
[2] Content based on 100 parts by mass of Copolymer (A)

As shown in Tables 1 and 2, the aqueous emulsion of the present invention produced using the ethylene-vinyl alcohol copolymer (A), as a dispersant, with a specific structure exhibited excellent storage stability at low temperatures, water-resistant adhesiveness, and applicability to adherends. Accordingly, the aqueous emulsion is preferably used for various adhesives, paints, fiber treatment agents, paper treatment agents, binders for inorganic materials, cement admixtures, mortar primers, and the like.

DESCRIPTION OF REFERENCE NUMERALS

1: Polymerization Vessel
2: Heat Exchanger
3 to 7: Pipe
8: Stirrer
9: Reaction Liquid Outlet Pipe
10: Vinyl Ester Inlet Pipe
11, 12: Refrigerant Pipe
13: Gas Discharge Pipe
21: Maxblend Blade
22: Supermix MR203
23: Supermix MR205
24: Fullzone Blade

The invention claimed is:

1. An aqueous emulsion, comprising:
an ethylene-vinyl alcohol copolymer (A) as a dispersant; and
a polymer (B) comprising an unsaturated ethylenic monomer unit as a dispersoid,
wherein the ethylene-vinyl alcohol copolymer (A) has a content of ethylene units in a range of from 1 to less than 20 mol %, and
wherein ethylene units in the ethylene-vinyl alcohol copolymer (A) have a block character in a range of from 0.90 to 0.99.

2. The emulsion of claim 1, wherein the ethylene-vinyl alcohol copolymer (A) has a viscosity-average degree of polymerization in a range of from 200 to 5000, and
a degree of saponification in a range of from 80 to 99.7 mol %.

3. The emulsion of claim 1, further comprising:
a compound with a molecular weight of 1000 or less, having a conjugated double bond, in a range of from 0.000001 to 0.01 parts by mass, based on 100 parts by mass of the ethylene-vinyl alcohol copolymer (A).

4. The emulsion of claim 1, wherein the polymer (B) comprises 70 mass % or more, based on total monomer units, of monomer units derived from at least one selected from the group consisting of a vinyl ester monomer, a (meth)acrylic ester monomer, a styrene monomer, and a diene monomer.

5. The emulsion of claim 1, wherein an (A)/(B) mass ratio of the ethylene-vinyl alcohol copolymer (A) to the polymer (B) is in a range of from 2/98 to 40/60.

6. The emulsion of claim 1, further comprising:
an aliphatic alcohol (C) in a range of from 0.0001 to 1 part by mass, based on 100 parts by mass of the ethylene-vinyl alcohol copolymer (A).

7. An adhesive, comprising:
the aqueous emulsion of claim 1.

8. A method of producing the aqueous emulsion of claim 1, the method comprising:
emulsion polymerizing the unsaturated ethylenic monomer in the presence of the dispersant comprising the ethylene-vinyl alcohol copolymer (A).

9. The emulsion of claim 1, wherein the polymer (B) comprises 70 mass % or more, based on total monomer units, of a monomer comprising a vinyl ester monomer, a (meth)acrylic ester monomer, a styrene monomer, a diene monomer, or a mixture of two or more of these.

10. The emulsion of claim 1, wherein the ethylene-vinyl alcohol copolymer (A) has a viscosity-average degree of polymerization in a range of from 200 to 5000.

11. The emulsion of claim 1, wherein the ethylene-vinyl alcohol copolymer (A) has a degree of saponification in a range of from 80 to 99.7 mol %.

12. The emulsion of claim 1, further comprising:
- a compound with a molecular weight of 1000 or less, having a conjugated double bond, in a range of from 0.000001 to 0.01 parts by mass, based on 100 parts by mass of the ethylene-vinyl alcohol copolymer (A); and
- an aliphatic alcohol (C) in a range of from 0.0001 to 1 part by mass, based on 100 parts by mass of the ethylene-vinyl alcohol copolymer (A).

* * * * *